United States Patent
Schumacher

[11] 3,858,407
[45] Jan. 7, 1975

[54] COMBINATION LIQUID TRAPPING SUCTION ACCUMULATOR AND EVAPORATOR PRESSURE REGULATOR DEVICE

[75] Inventor: Ernest W. Schumacher, Portsmouth, Va.

[73] Assignee: Virginia Chemicals Inc., Portsmouth, Va.

[22] Filed: Aug. 14, 1973

[21] Appl. No.: 388,281

[52] U.S. Cl. .................................. 62/217, 62/503
[51] Int. Cl. ............................................. F25b 41/04
[58] Field of Search ............................... 62/217, 503

[56] References Cited
UNITED STATES PATENTS

| | | | |
|---|---|---|---|
| 2,504,184 | 4/1950 | Dawson | 62/503 |
| 3,214,932 | 11/1965 | Grant | 62/503 |
| 3,525,234 | 8/1970 | Widdowson | 62/217 |
| 3,626,715 | 12/1971 | Bottum | 62/503 |
| 3,798,921 | 3/1974 | Scherer | 62/503 |
| 3,810,366 | 5/1974 | Orth | 62/217 |

*Primary Examiner*—Meyer Perlin

[57] ABSTRACT

A combination liquid trapping suction accumulator and evaporator pressure regulator device used intermediate the compressor and evaporator in a vapor-compression refrigeration system as a protective device for the compressor. The device is characterized by the positioning of the evaporator pressure regulator chamber intermediate the inlet and outlet ports of the accumulator housing. Thus, evaporator pressure regulation is accomplished simultaneously with liquid accumulation in a compact and readily serviceable, unitary housing.

1 Claim, 11 Drawing Figures

Patented Jan. 7, 1975

COMBINATION LIQUID TRAPPING SUCTION ACCUMULATOR AND EVAPORATOR PRESSURE REGULATOR DEVICE

CROSS REFERENCE TO RELATED APPLICATION:

A modification of the assignee's earlier filed application entitled LIQUID TRAPPING SUCTION ACCUMULATOR (Ser. No. 359,569), filed May 11, 1973.

The present application is characterized in its combining of an evaporator pressure regulator device with a liquid trapping suction accumulator.

BACKGROUND OF THE INVENTION

Automobile air conditioning and refrigeration systems are conventionally subject to a high rate of failure, due principally to liquid entering the compressor. These failures frequently occur after a short shut-down of the automobile which defeats the thermostatic expansion valve, permitting liquid to migrate from the condenser into the evaporator. As the automobile air conditioning system is restarted, the liquid goes to the compressor with damaging results. The automobile system is characterized by the extraordinarily wide range of flow rates, a principal aim being to return the oil through the eductor, regardless of flow rate.

Liquid suction accumulators are widely employed to solve the problem of liquid entering the compressor. However, there is no prior art showing a combination of these elements within a single working system and utilizing pressure drops obtained, for example, through the evaporator pressure regulator as an assistance in the eduction of oil through the system.

SUMMARY OF THE INVENTION

According to the present invention, an evaporator pressure regulator (EPR) is interposed between the inlet and outlet ports of an accumulator chamber. The evaporator pressure regulator (EPR) may include an evaporator pressure regulator device of the bellows or other type, regulating vaporous flow from inlet to outlet, according to pressure within the system. The pressure drop obtained through the evaporator pressure regulator device is utilized in drawing oil through the eductor tube.

Modification of the invention include positioning of an expansion valve within the accumulator housing, use of a combined thermostatic expansion valve and a filter drier adjacent to the accumulator chamber, positioning of both the expansion valve and a desiccant within the accumulator chamber, utilization of a fixed orifice or capillary feeding device intermediate the filter drier and the evaporator in the system, positioning of the evaporator pressure regulator device perpendicularly with respect to the top of the accumulator chamber and providing the evaporator pressure regulator chamber with quick disconnects, fitting and sealing fixtures.

Figure 1:
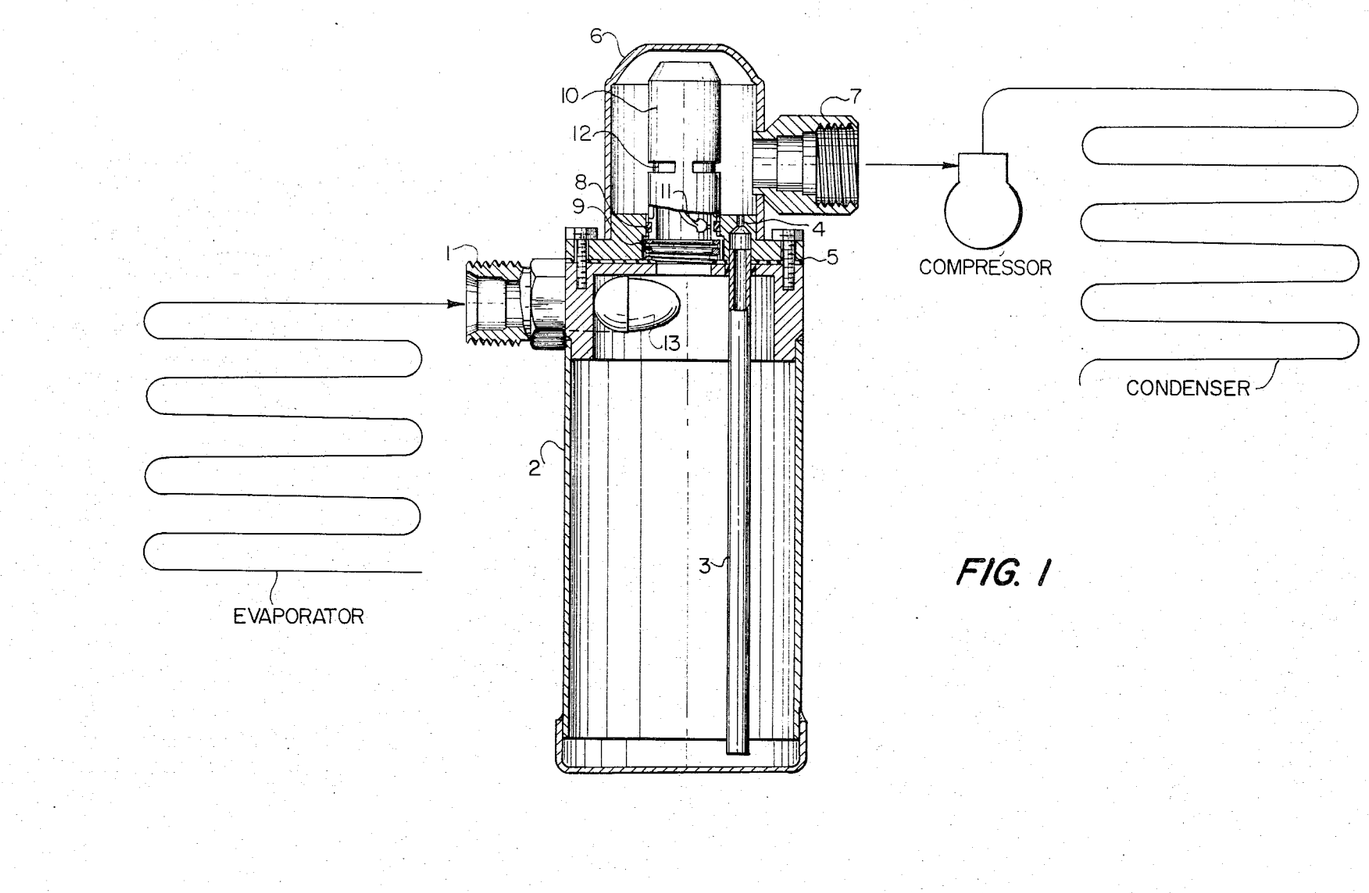
FIG. 1 is a schematic view, partially in vertical section, showing a combined evaporator pressure regulator chamber and accumulator, according to the present invention.

DESCRIPTION OF THE PREFERRED EMBODIMENTS:

The primary function of a suction accumulator is to prevent liquid refrigerant from entering the compressor. It must also provide positive oil return at all system flow rates. Conventional accumulators are designed to provide adequate pressure drop for positive oil return at minimum system flow rates. However, when systems experience high maximum to minimum flow rate ratios, accumulator pressure drops at high load conditions become excessive. The combining of the EPR and accumulator can solve this problem. The EPR represents a finite pressure drop in the suction line at all operating conditions. In fact, the pressure drop across the EPR is generally greatest at low loads. Integration of the accumulator and the EPR allows the pressure drop across the EPR to be utilized for positive oil return. This arrangement allows the accumulator to be designed for minimum pressure drop while still performing its liquid trapping function. In FIG. 1 the refrigerant-oil mixture is shown entering the accumulator vessel 2 at inlet connection 1. Oil is returned through eductor tube 3 which is connected to outlet orifice 4. Orifice 4 is arranged to bypass the EPR 10, hence taking advantage of its pressure differential for oil return. The oil is mixed with the refrigerant vapors exiting the EPR 10 in chamber 6 and returned to the compressor through outlet connection 7. O-ring 8 provides a positive seal between the inlet and outlet of EPR 10 and compression spring 9 provides positive retention of the EPR 10 in its socket. EPR may be of the bellows-type containing an inert gas such as nitrogen which is charged through nipple 11. Pressure changes move the bellows which moves a spool or slide across peripheral slots 12, so as to regulate vaporous flow. A tangential entry device 13 may be positioned adjacent inlet connection 1, to provide consistent liquid and vapor separation.

Figure 2:
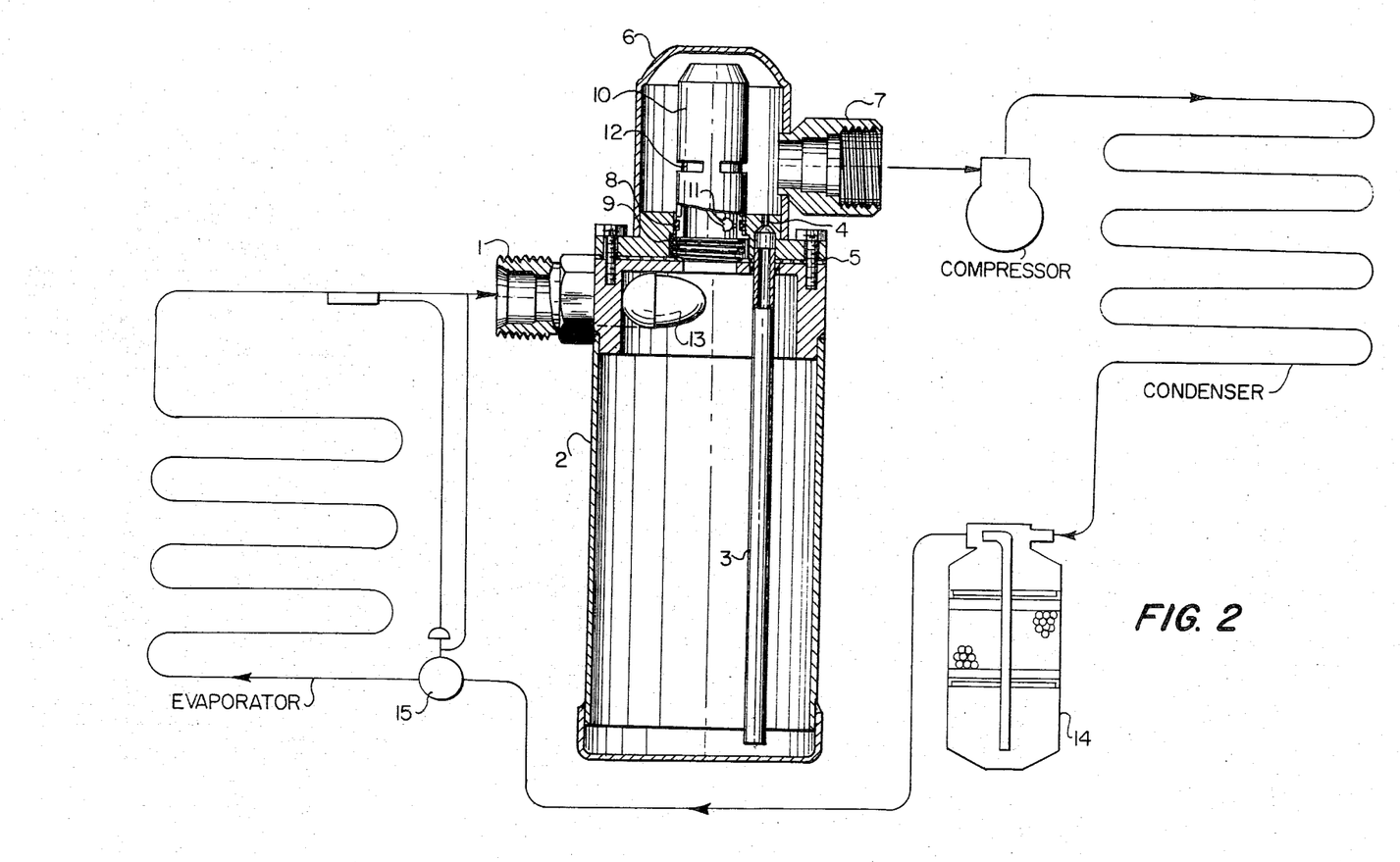
FIG. 2 is a modified schematic view, partially in section, wherein a filter drier or receiver drier and thermostatic expansion valve elements have been interposed between the condenser and the evaporator in the system.

FIG. 2 schematically shows the combination EPR-accumulator (described in FIG. 1) in a complete system, including a filter-drier or receiver-drier 14 with a desiccant mounted therein. However, the receiver-drier is no longer fully required, since the accumulator can perform the liquid storage function for which the receiver was previously required. A thermostatic expansion valve 15 may be positioned intermediate filter-drier 14 and the evaporator. Two additionaal advantages are also obtained with this arrangement. First, loss of liquid subcooling, which normally occurs in a receiver, may be reduced. The much smaller filter-drier 14 is always liquid full, which enables it to better retain any subcooling obtained in the condenser. In fact, filter-drier 14 may provide additional subcooling, if it can be located in an ambient somewhat below condensing temperature. The second advantage is that evaporator performance can be improved, since proper control arrangement will allow "overfeeding" of the evaporator without risk of liquid entering the compressor.

Figure 3:
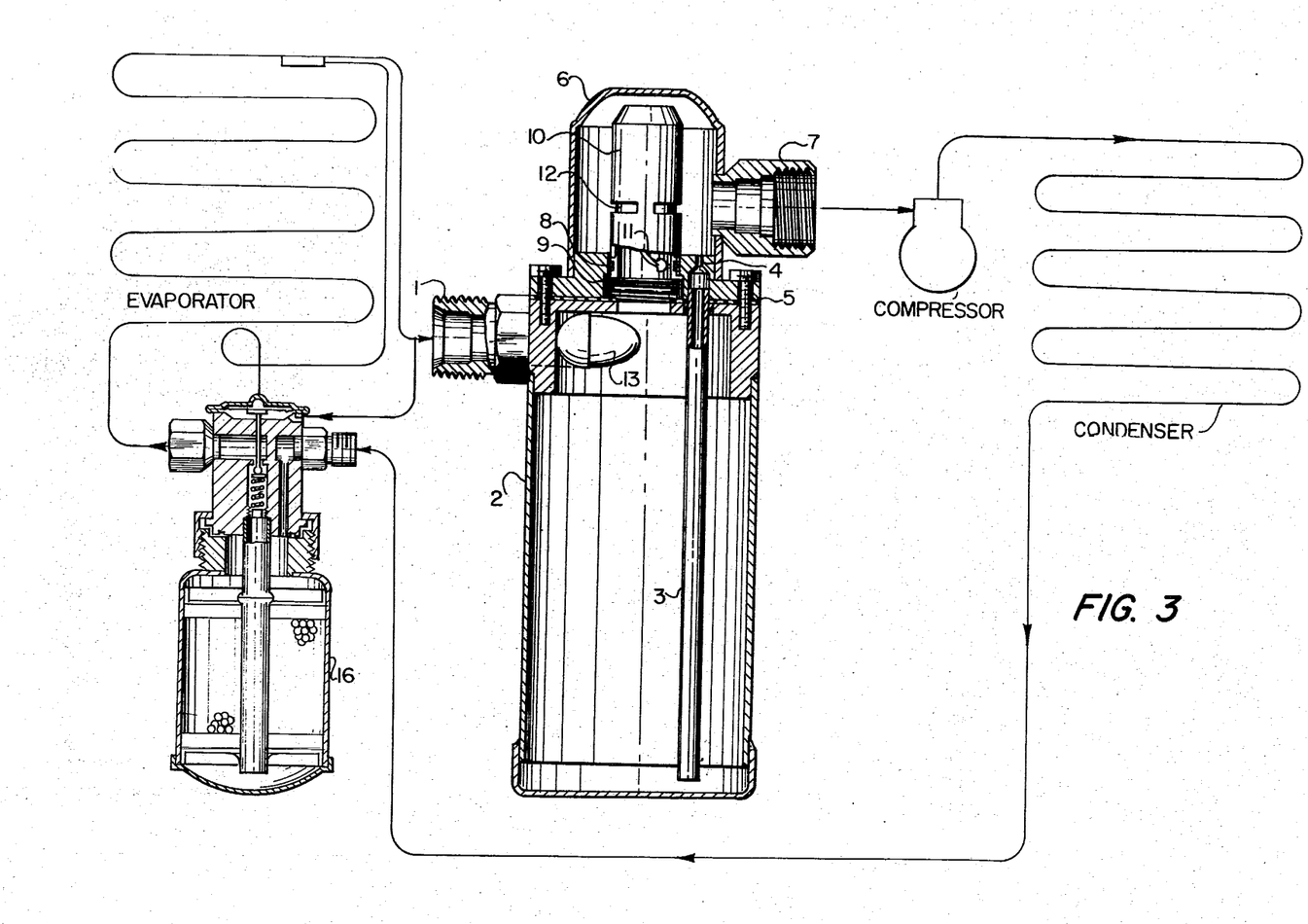
FIG. 3 is a schematic view, partially in vertical section, showing a further modification wherein a combined filter drier and thermostatic expansion valve unit have been interposed between the condenser and the evaporator system.

FIG. 3 schematically shows a system similar to the one shown in FIG. 2. This system, however, shows the expansion valve and filter-drier as a combined unit 16. Since the filter-drier is a much smaller package than the receiver-drier, its choice of location is broadened considerably. Though no performance advantages accrue with this arrangement, it does require fewer plumbing connections and allows ease of filter-drier replacement, a critical characteristic in miniaturized automobile air conditioning systems.

Figure 4:
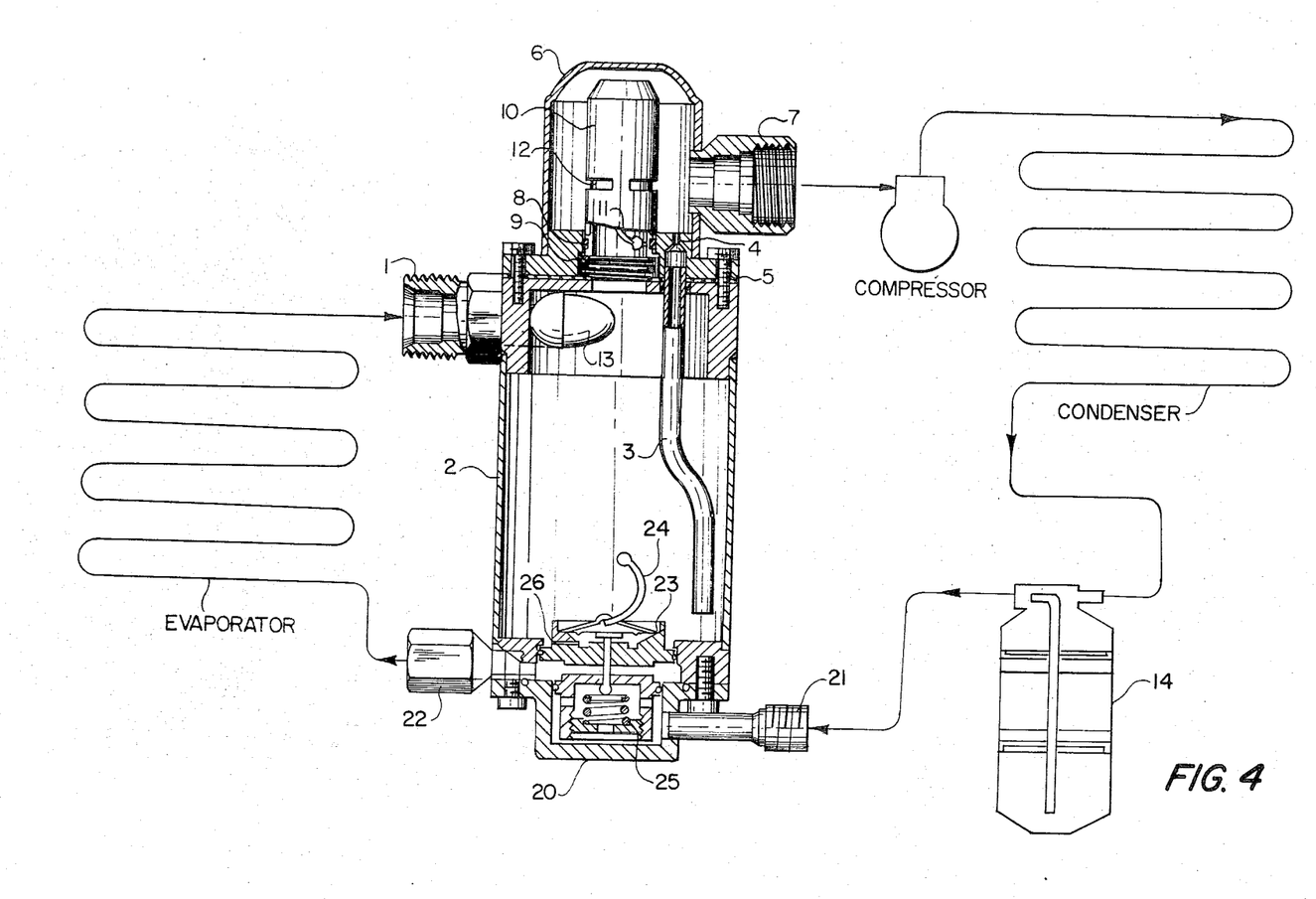
FIG. 4 is a schematic view, partially in vertical section, showing a further modification wherein a cartridge type expansion valve is mounted within the bottom of the accumulator chamber and intermediate the condenser and evaporator in the system.

The FIG. 4 system is similar to the one described in FIG. 3, except that a cartridge type 20 expansion valve has been located in the accumulator 2. This arrangement makes possible the elimination of the remote bulb and external equalizer connections normally required with conventional expansion valves. The elimination of these small fragile connections reduces the possibility of system failures caused by fracture of these lines. Serviceability is also enhanced, since these connections do not have to be made during expansion valve replacement.

Expansion valve 20 may include entry port 21, exit port 22, equalizing port 26, diaphragm or bellows 23, charged by nipple 24 and the compression element 25.

Figure 5:
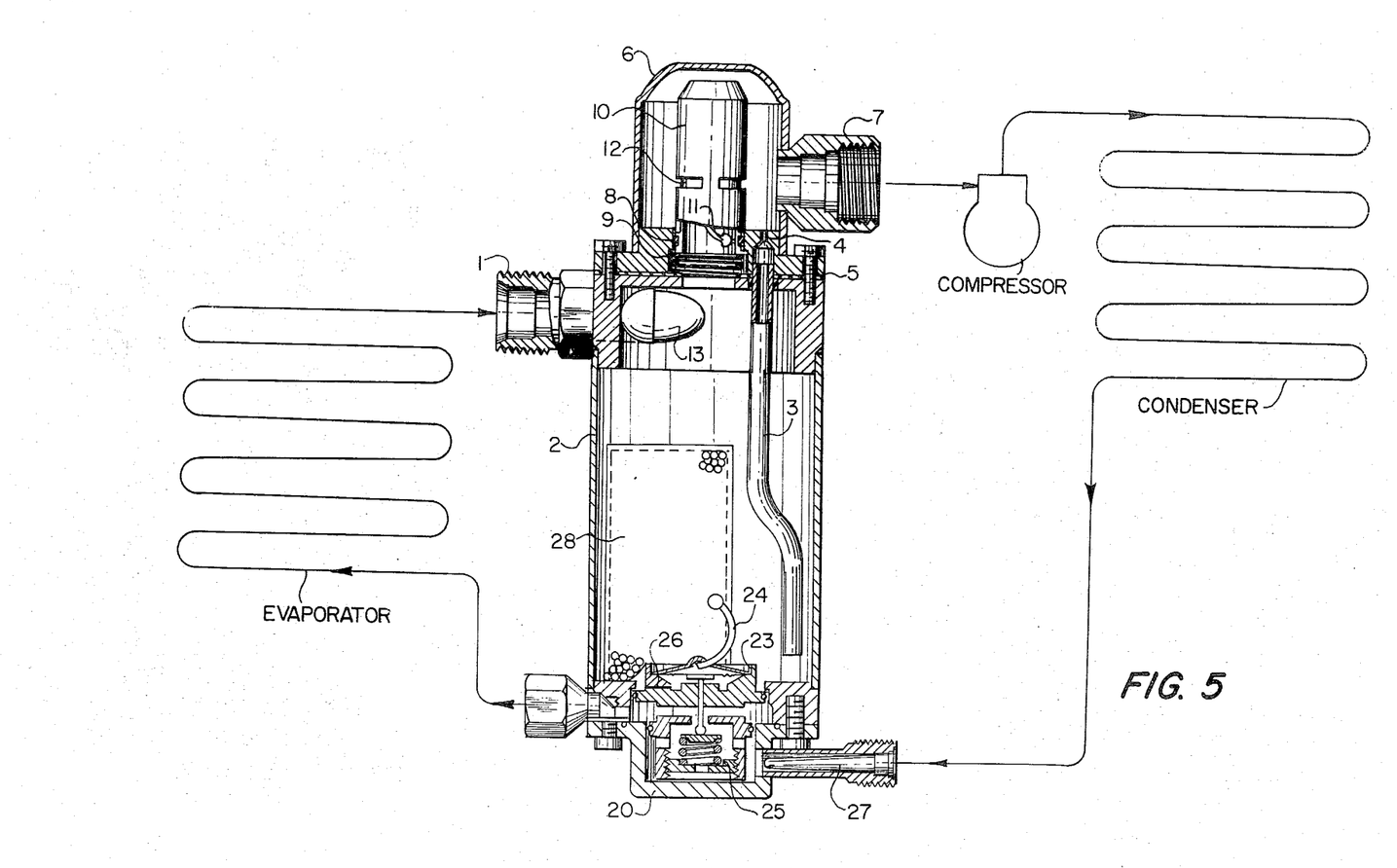
FIG. 5 is a schematic view, partially in vertical section, showing a further modification, such as in FIG. 4, wherein the cartridge type expansion valve includes a fine mesh strainer in its inlet port and the drier element has been mounted directly within the accumulator chamber.

FIG. 5 represents a system with a totally integrated control package and differs from FIG. 4 in that the filter-drier as a separate unit has been eliminated, and the contaminant control functions have been added to the combined control package. The EPR-accumulator combination still provides the advantages described in FIG. 1. Removal of moisture and acids is accomplished in the accumulator vessel and solid contaminants are retained in a fine mesh strainer 27 located at the expansion valve inlet 21. Moisture and other contaminant removal may be accomplished in the suction side of many refrigerant systems as effectively as it is done in the high pressure liquid phase. A desiccant bag 28 may be supported within the accumulator 2.

Figure 6:
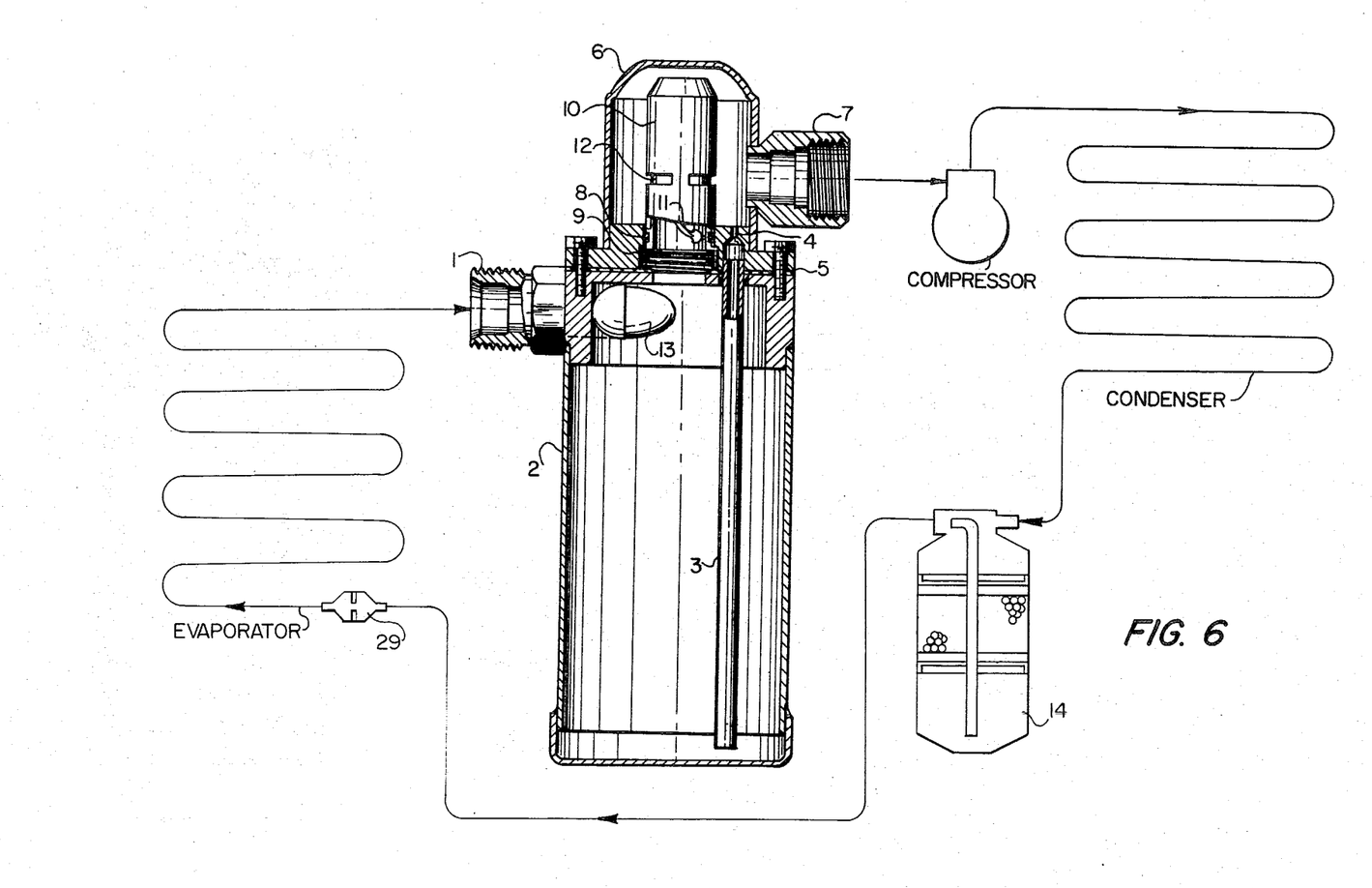
FIG. 6 is a schematic view, partially in vertical section, showing a further modification wherein a fixed orifice device is interposed between the receiver drier and the evaporator.

FIG. 6 represents a system in which the expansion valve has been replaced with a fixed orifice, flexible orifice, or capillary 29.

Since the suction accumulator 2 is able to positively manage liquid on the low side, it now becomes feasible as illustrated in FIG. 6, to consider the elimination of the costly and complex expansion valve. The fixed or flexible orifice 29 does not have the ability to maintain a liquid seal at its inlet with changing system conditions. For this reason, they may be abandoned in favor of a capillary tube which has this inherent capability.

Proper cap tube selection would allow the evaporator to be completely fed during maximum load conditions thereby improving evaporator performance. Manifestly, the fixed orifice or capillary tube may be an integral part of filter-drier 14, if properly located.

Figure 7:
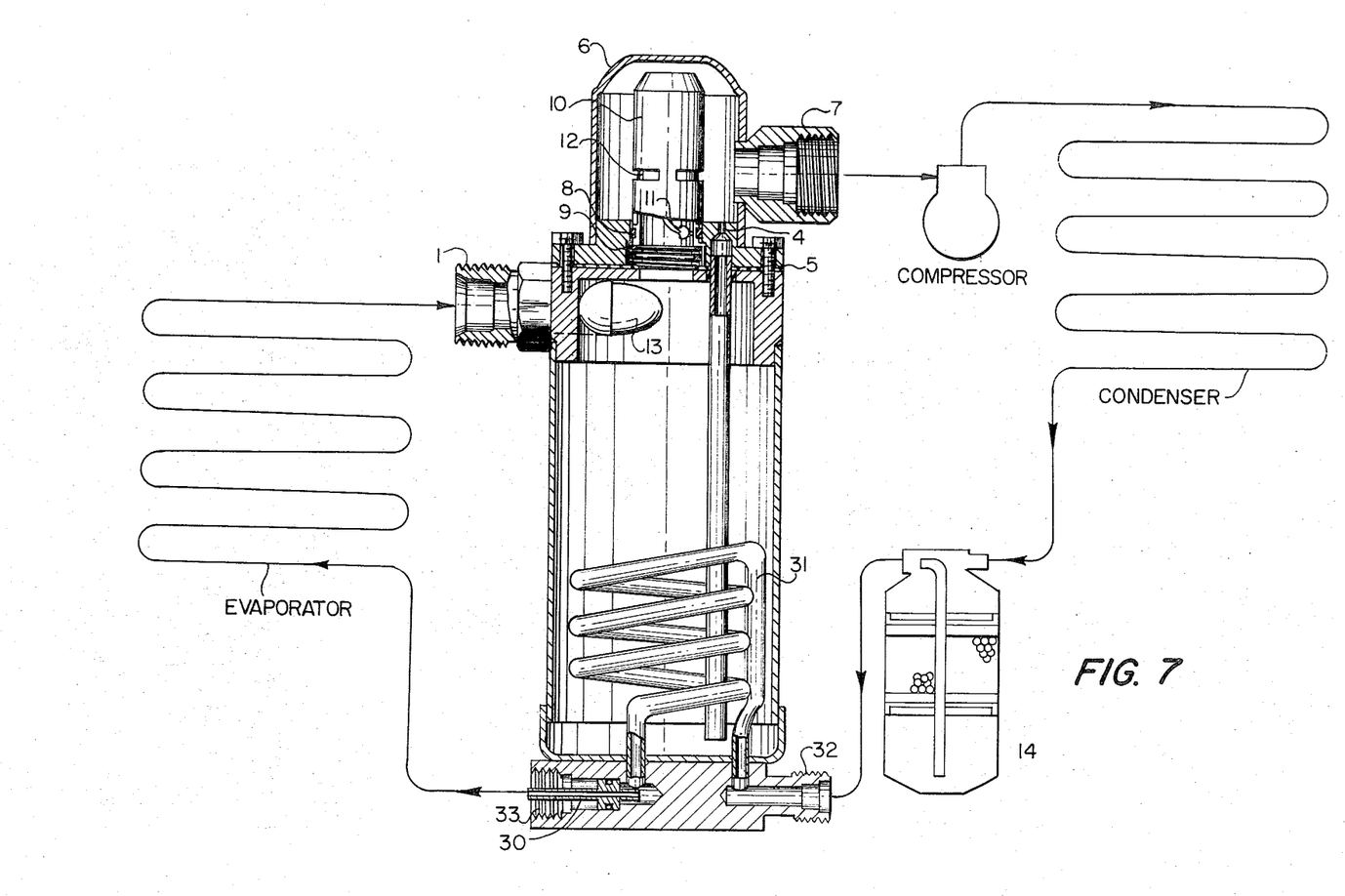
FIG. 7 is a schematic view, partially in section, showing a further modification wherein a capillary tube device is mounted in the bottom of the accumulator chamber and includes a heat exchanger preceeding the inlet ports of the capillary device.

FIG. 7 illustrates a system similar to the one shown in FIG. 6, except that the capillary 30 has been located at the bottom of the accumulator 2. A liquid to suction heat exchanger 31 has also been positioned intermediate entry port 32 and exit port 33 to improve the system's thermodynamic performance. With this arrangement, the evaporator may be fully used since the requirement of superheat at the evaporator exit no longer exists.

The functions of the filter-drier may also be located within accumulator 2 as described, above.

Figure 8:
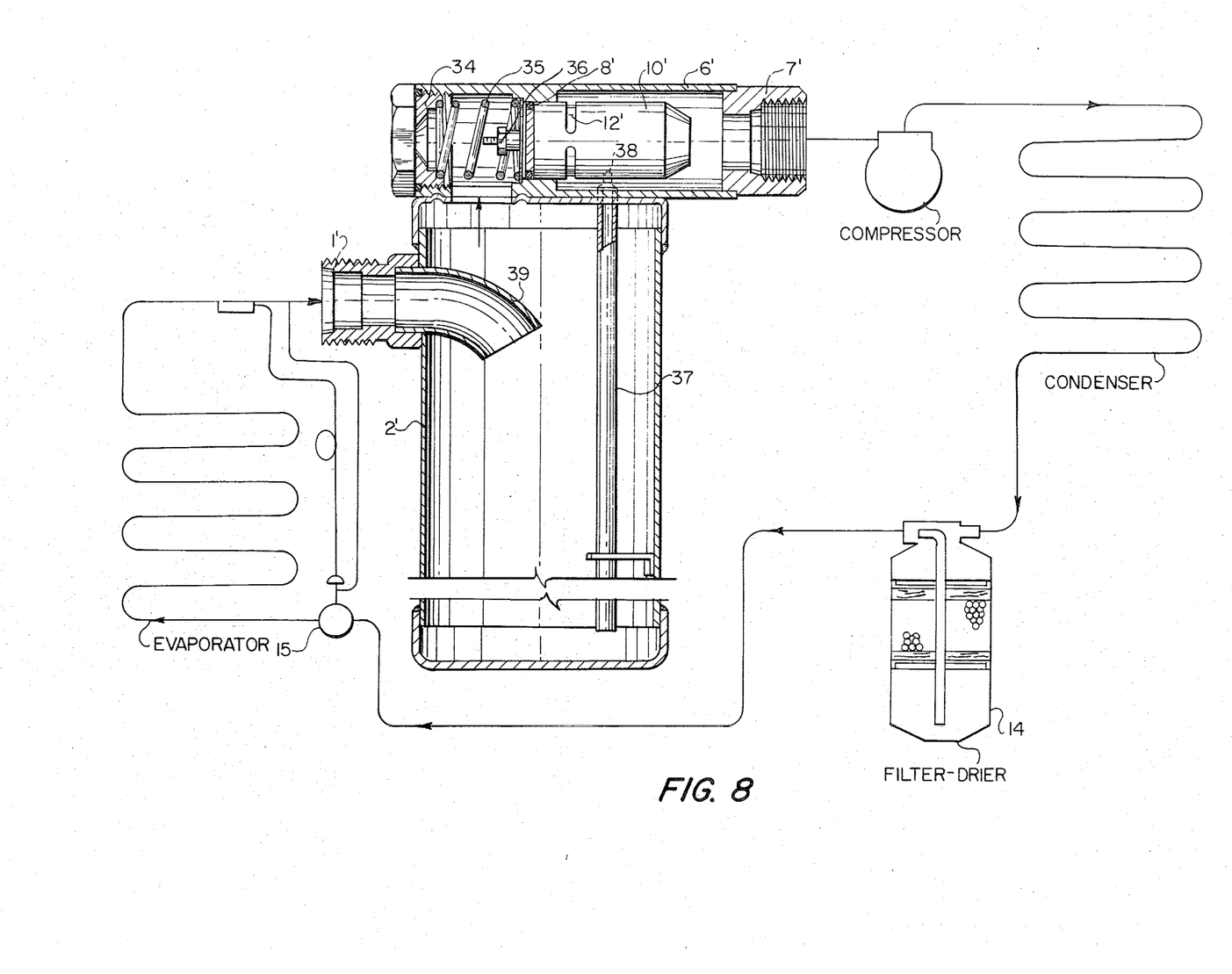
FIG. 8 is a schematic view, partially in vertical section, showing a horizontal disposition of the evaporator pressure regulator chamber atop the accumulator housing.

FIG. 8 schematically shows a modified system that will function in a manner similar to the one described in FIG. 1. The accumulator/EPR hardware, however, has been arranged to allow horizontal mounting of the EPR. Access for service and replacement of the EPR is provided through the O-ring sealed plug 34 just to the left of the threaded stem and nut assembly 36 of the EPR valve. This plug also supports the spring 35 which retains the EPR in its socket. Oil return is accomplished through the vertical tube 37 and orifice 38 in the same manner described in FIG. 1. A modified inlet 1' may be fitted with a downwardly bent hood 39.

Figure 9:
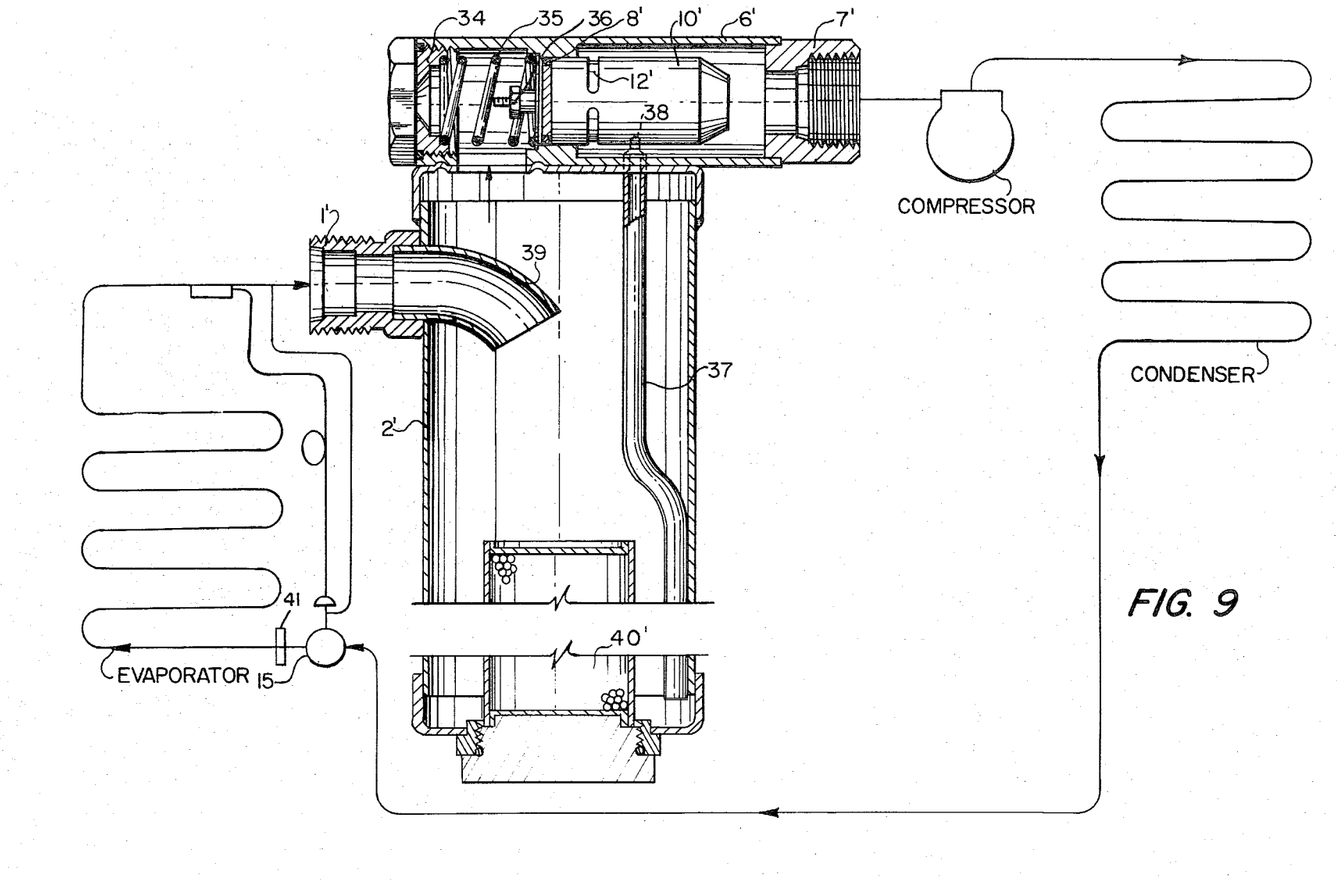
FIG. 9 is a schematic view, partially in vertical section, showing a further modification of the FIG. 8 concept, wherein a desiccant element is removably supported in the bottom of the accumulator chamber.

FIG. 9 shows the same schematic system as illustrated in FIG. 8. The difference is that the contaminant control functions of the normal liquid line filter-drier 14 are accomplished by a replaceable desiccant cartridge 40 located in the bottom of the accumulator 2. A fine mesh strainer 41 would also be used in the liquid line, for example, at the expansion valve inlet.

Figure 10:
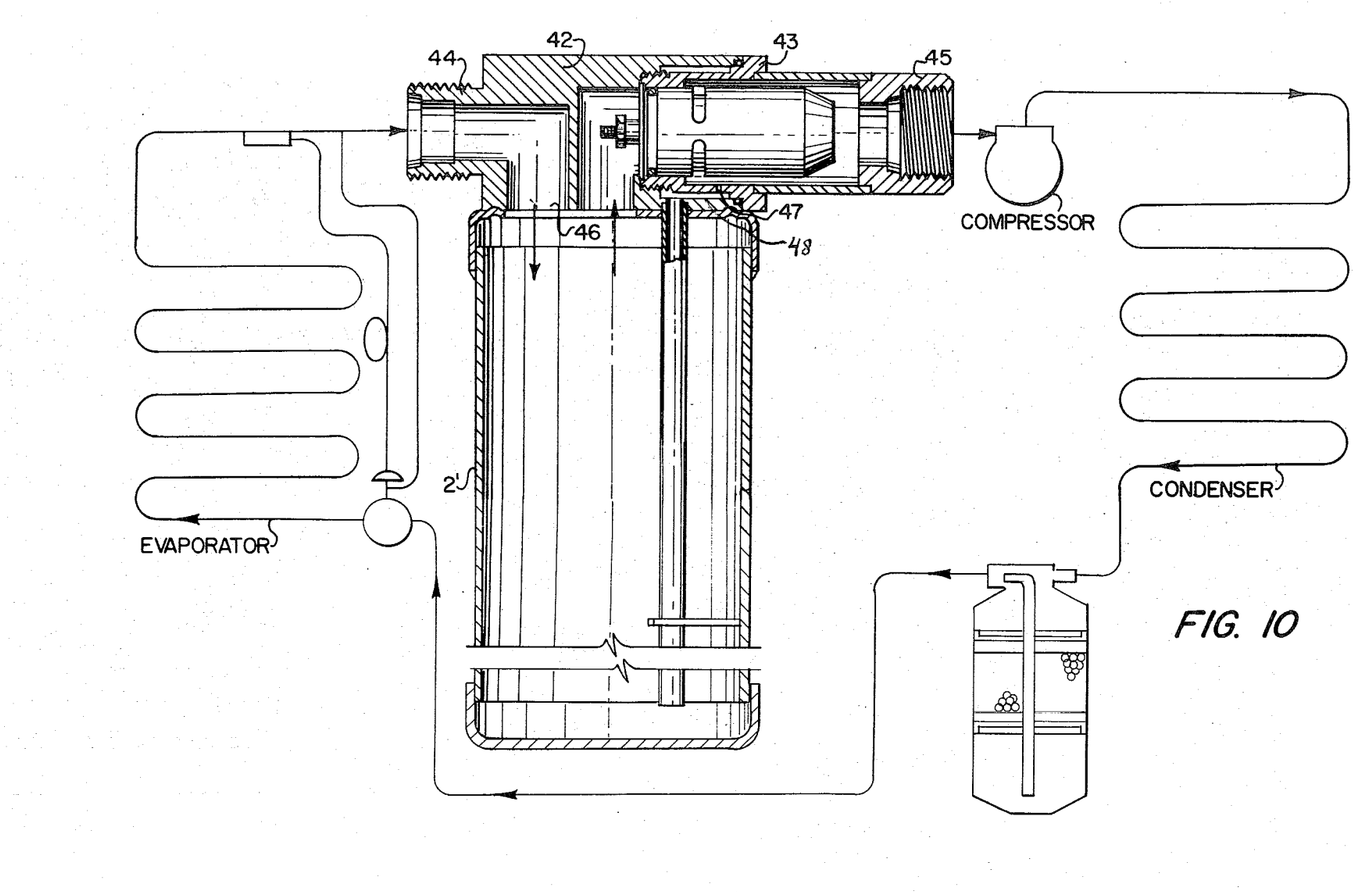
FIG. 10 is a schematic view, partially in vertical section, showing the evaporator pressure regulator horizontally and removably disposed with respect to the accumulator chamber and its inlet port exiting vapor axially from the accumulator chamber.

FIG. 10 shows a system which again would function in the same fashion as the system described in FIGS. 1 and 8. In the FIG. 10 system, however, the EPR is installed in a "tee flow" type hardware arrangement 42 located at the top of the accumulator vessel 2'. This configuration also allows horizontal mounting of the EPR with access being provided by removal of the outlet fitting adapter 43. This configuration also provides in-line "in and out" connections 44, 45. By relocating the inlet connector 44, left and right angle patterns could also be arranged. Oil return control orifice 47 is positioned intermediate annulus 48 and the evaporator pressure regulator chamber.

Figure 11:
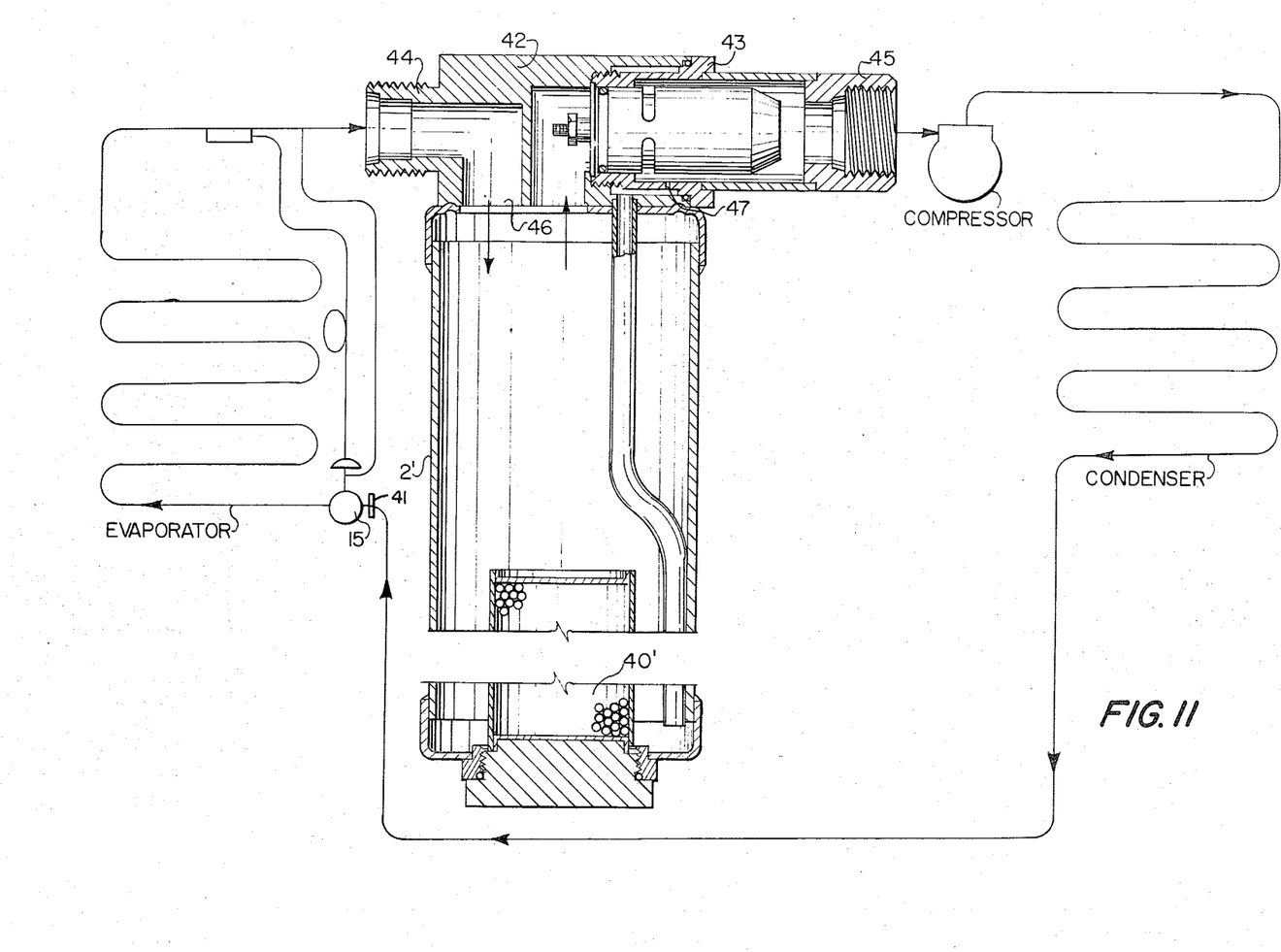
FIG. 11 is a schematic view, partially in section, showing a further modification of the FIG. 10 concept wherein the desiccant element has been removably introduced into the bottom of the accumulator chamber.

FIG. 11 shows an arrangement similar to FIG. 10, except that the replaceable desiccant cartridge 40' shown at the bottom of the accumulator and a liquid line strainer 41' have replaced the filter-drier. The contaminant control functions of the conventional filter-drier are accomplished in the same manner as described above in FIGS. 5, 7 and 9.

I claim:
1. A liquid trapping suction accumulator adapted for insertion in a vapor-compression refrigeration system between the evaporator and compressor, comprising:
   A. an accumulator chamber defined by a casing having a top and a bottom;
   B. inlet and outlet ports in the top, and opening into said chamber and respectively adapted for operative connection into said evaporator and said compressor;
   C. removable adaptor means forming an evaporator pressure regulator chamber positioned in said outlet port in communication with said accumulator chamber; said adaptor means being further characterized as
      i being threadably removably positioned adjacent the top of said accumulator chamber,
      ii containing an evaporator pressure regulator device in compressive sealing relationship to the adaptor means so as to gauge admission of vapor through said evaporator pressure regulator chamber and said outlet;
   D. a desiccant removably supported in the bottom of said accumulator chamber; and
   E. an eductor tube extending independently from the bottom of said accumulator chamber being offset in its lower portion to accommodate said desiccant while being in fluid communication with said evaporator pressure regulator chamber.

* * * * *